US008503847B2

(12) United States Patent
Kokubun et al.

(10) Patent No.: US 8,503,847 B2

(45) Date of Patent: Aug. 6, 2013

(54) METHOD OF ARRANGING CORES OF MULTI-CORE FIBER

(75) Inventors: Yasuo Kokubun, Yokohama (JP); Masanori Koshiba, Sapporo (JP); Toshio Morioka, Tokyo (JP)

(73) Assignees: National University Corporation Yokohama National University, Yokohama-shi, Kanagawa (JP); National University Corporation Hokkaido University, Sapporo-shi, Hokkaido (JP)

( * ) Notice: Subject to any disclaimer, the term of this patent is extended or adjusted under 35 U.S.C. 154(b) by 225 days.

(21) Appl. No.: 13/122,335

(22) PCT Filed: Oct. 2, 2009

(86) PCT No.: PCT/JP2009/067238

§ 371 (c)(1), (2), (4) Date: Jun. 10, 2011

(87) PCT Pub. No.: WO2010/038863

PCT Pub. Date: Apr. 8, 2010

(65) Prior Publication Data

US 2011/0243517 A1 Oct. 6, 2011

(30) Foreign Application Priority Data

Oct. 3, 2008 (JP) ................................ 2008-258286

(51) Int. Cl.
*G02B 6/02* (2006.01)

(52) U.S. Cl.
USPC ........................................................ 385/126

(58) Field of Classification Search
None
See application file for complete search history.

(56) References Cited

U.S. PATENT DOCUMENTS 8,320,724 B2 * 11/2012 Sasaoka ........................ 385/121
2002/0176677 A1 11/2002 Kumar et al.
2007/0274652 A1 * 11/2007 Dangui et al. ................ 385/126
2012/0141081 A1 * 6/2012 Dangui et al. ................ 385/126

FOREIGN PATENT DOCUMENTS

CN 1687808 A 10/2005
JP 49-032649 A1 3/1974
JP 56-049507 U 5/1981
JP 2001-033638 A 2/2001
WO 02/090275 A2 11/2002

OTHER PUBLICATIONS

English Translation of International Preliminary Report on Patentability (Chapter II of the Patent Cooperation Treaty) (PCT Article 36 and Rule 7), issued in corresponding International Application No. PCT/JP2009/067238.

(Continued)

*Primary Examiner* — Sung Pak

(74) *Attorney, Agent, or Firm* — Westerman, Hattori, Daniels & Adrian, LLP

(57) ABSTRACT

A multi-core fiber of the present invention employs the multi-core fiber mode, which corresponds to the "uncoupled" operation aspect in which individual cores are used independently for single-mode transmission, to perform space division multiplexing transmission using a multi-core fiber in which multiple single-mode cores are stored in one optical fiber. More specifically, the multi-core fiber of the present invention forms an uncoupled multi-core fiber that makes individual cores correspond to single-mode, independent transmission channels.

3 Claims, 15 Drawing Sheets

OTHER PUBLICATIONS

English Translation of Written Opinion of the International Preliminary Examining Authority (PCT Rule 66) dated Sep. 7, 2010, issued in corresponding International Application No. PCT/JP2009/067238.
English Translation of Written Opinion of the International Searching Authority (PCT Rule 43bis.1) dated Dec. 15, 2009, issued in corresponding International Application No. PCT/JP2009/067238.
Notification of Transmittal of Translation of the International Preliminary Report on Patentability (Form PCT/IB/338) of International Application No. PCT/JP2009/067238 mailed May 19, 2011 with Form PCT/IPEA/409.
Written Response dated Aug. 2, 2010, issued in corresponding International Application No. PCT/2009/067238.
Written Response dated Nov. 5, 2010, issued in corresponding International Application No. PCT/2009/067238.
Extended European Search Report dated Jul. 17, 2012, issued in corresponding European Patent Application No. 09817895.7, (7 pages).
Knight, et al., "Multicore Photonic Crystal Fibres", International Conference on Optical Fiber Sensors, Technicaldigest, Postconference Edition, dated Oct. 28, 1997, pp. 670-673, XP000992467.
Rosinski B. et al. "Multichannel Transmission of a Multicore Fiber Coupled with Vertical-Cavity Surface-Emitting Lasers" Journal of Lightwave Technology, vol. 17, No. 5, May 1999, pp. 807-810.
Saitoh K. et al., "Full-Vectoral Imaginary-Distance Beam Propagation Method Based on a Finite Element Scheme: Application to Photonic Crystal Fibers" IEEE Journal of Quantum Electronics, vol. 38, No. 7, Jul. 2002; pp. 927-933.
Stearns C. R. et al., "Angular Division Multiplex for Fiber Communication Using Graded-Index Rod Lenses" Journal of Lightwave Technology, Vo,. LT-2, No. 4, Aug. 1984, pp. 358-362.
Tsekrekos C. P. "Temporal Stability of a Transparent Mode Group Diversity Multiplexing Link" IEEE Photonics Technology Letters, vol. 18, No. 23, Dec. 1, 2006; pp. 2484-2486.
International Search Report of PCT/JP2009/067238, mailing date of Dec. 15, 2009.
Written Response dated Aug. 2, 2010, issued in International Application No. PCT/2009/067238.
Written Opinion of the International Searching Authority of Application No. PCT/JP2009/0672378, mailing date of Dec. 15, 2009.
Written Opinion of the International Searching Authority of Application No. PCT/JP2009/0672378, mailing date of Sep. 7, 2010.
Chinese Office Action dated Jul. 24, 2012, issued in corresponding Chinese Patent Application No. 200980139370.0, (7 pages). With English Translation.
Yoshikawa H. et al., "Analysis of Asymmetric Two-Core Single-Mode Optical Fibers for Subscriber Lines" C-I vol. J74-C-I, w/ Partial English Translation, 1991, pp. 307-312, cited in ISR.
Imamura K. et al., "Multi-core holey fibers for ultra large capacity wide-band transmission" Fitel Photonics Laboratory, Furukawa Electric Co., Ltd; 2008, p. 276, cited in spec.
Inao S. et al. "High Density Multicore-Fiber Cable" The Furukawa Electric Co., 1979, pp. 370-384, cited in spec.
Feldman M. et al., "High Capacity Bused Interconnects Using Optical Slab Waveguides" Department of Electrical & Computer Engineering, 1999, cited in spec.
Snyder W. A. et al., "Mode coupling"; Optical Waveguide Theory; 1983, pp. 542-585, cited in spec.
Suematsu Y. et al., "Refractive Index Distribution and Group Delay Characteristics in Multiple Dielectric Optical Waveguides" Trans. IECE '74/9 vol. 57-C No. 9, 1974, pp. 289-296.
Chinese Office Action dated Mar. 27, 2013, issued in corresponding Chinese Patent Application No. 2009801393700, with English translation (6 pages).
European Office Action dated Mar. 27, 2013, issued in corresponding European Patent Application No. 09817895.7 (4 pages).

* cited by examiner 21A
2b
n
$n_1$
$n_2$
$\beta_0^{(1)}$ 21B
2c
n
$n_3$
$n_2$
$\beta_0^{(2)}$ 21C
2d
n
$n_4$
$n_5$
$n_2$
$\beta_0^{(3)}$

METHOD OF ARRANGING CORES OF MULTI-CORE FIBER

TECHNICAL FIELD

The present invention relates to a multi-core fiber for use in high-density space division multiplexing transmission.

BACKGROUND ART

Conventionally, study has been conducted on a multi-mode fiber, and many methods have been proposed for solving a transmission capacity limitation caused by a mode group delay difference. One of the proposed methods is that the mode groups are separated for electrically equalizing the group delay difference (Non-Patent Document 1). After that, based on the fact that the mode propagation angle corresponds approximately to the mode order in a step-index fiber, angular division multiplexing was proposed (Non-Patent Document 2). In addition, in 2006, mode group diversity multiplexing was proposed in which almost the same concept is applied to a graded-index fiber (Non-Patent Document 3). In all fibers described in those documents, each eigen mode is not used as an independent transmission channel represented in the orthogonal function system but is used as a mode group for multiplexing/demultiplexing using propagation angle differences, with the result that the transmission capacity is smaller than that of a single-mode fiber. That is, the technologies described in those documents are not those for increasing the transmission capacity to the maximum.

Non-Patent Document 4 describes mode division multiplexing in which each of the modes of a multimode fiber is made to correspond to a transmission channel.

The technology described in Non-Patent Document is known as a technology for implementing a conventional uncoupled multi-core fiber of homogeneous cores using a photonic crystal fiber.

Non-Patent Document 6 discloses a technology for reducing the crosstalk quantity between two cores, which have different propagation constants, to a fixed value or lower.

PRIOR ART DOCUMENTS

NON-Patent Documents

Non-Patent Document 1: Suematsu Yasuharu and Furuya Kazuhito, "Refractive Index Distribution and Group Delay Characteristics in Multimode Dielectric Optical Waveguides", Trans. IECE of Japan, Vol. 57-C, no. 9, pp. 289-296 (1974)

Non-Patent Document 2: R. C. Stearns, C. K. Asawa, S-K Yao, "Angular Division Multiplexing for Fiber Communication Using Graded-Index Rod Lenses", J. Lightwave Technol., vol. LT-4, no. 2, pp. 358-362 (1984)

Non-Patent Document 3: C. P. Tsekrekos, M. de Boer, A. Martinez, F. M. J. Willems, A. M. J. Koonen, "Temporal Stability of a Transparent Mode Group Diversity Multiplexing Link", Photon. Technol. Lett., vol. 18, no. 23, pp. 2484-2486 (2006)

Non-Patent Document 4: Martin Feldman, Ramachandran Vaidyanathan, and Ahmed El-Amawy, "High speed, High Capacity Bused Interconnects Using Optical Slab Waveguides", Lect Notes Comput Sci. Vol. 1586 pp. 924-937 (1999)

Non-Patent Document 5: Imamura Katsunori, Mukasa Kazunori, Sugisaki Ryuichi, Miura Yu, Yagi Takeshi, "Multi-core Holey Fibers for Ultra Large Capacity Wide-Band Transmission", 2008 IEICE Communication Society Convention, B-13-22 (2008)

Non-Patent Document 6: Yoshikawa Hiroshi, Yamamoto Yuzo, Oono Yutaka "Analysis of asymmetric two-core single-mode optical fibers for subscriber lines.", Trans. IECE of Japan, C-I Vol. J74-C-I No. 9 pp. 307-312, September, 1991

Non-Patent Document 7: S. Inao, T. Sato, H. Hondo, M. Ogai, S. Sentsui, A. Otake, K. Yoshizaki, K. Ishihara, and N. Uchida, "High density multi-core-fiber cable", Proceedings of the 28th International Wire & Cable Symposium (IWCS), pp. 370-384, 1979.

Non-Patent Document 8: B. Rosinski, J. W. D. Chi, P. Grasso, and J. L. Bihan, "Multichannel transmission of a multicore fiber coupled with Vertically-Coupled-Surface-Emitting Lasers", J. Lightwave Technol., vol. 17, no. 5, pp. 807-810, 1999.

Non-Patent Document 9: K. Saitoh and M. Koshiba, "Full-vectorial imaginary-distance beam propagation method based on a finite element scheme: application to photonic crystal fibers", IEEE Journal of Quantum Electronics, Vol. 38, No. 7, pp. 927-933 (2002)

Non-Patent Document 10: A. W. Snyder and J. D. Love, "Optical Waveguide Theory", Chapman and Hall, London, 1983.

DISCLOSURE OF THE INVENTION

Problems to be Solved by the Invention

The electric field distribution of each eigen mode propagating through an optical fiber is expressed by expression (1) given below.

$$E(r,t)=e_p A_i(r_t)\exp[j(\omega_\nu t-\beta_i z)] \quad (1)$$

In expression (1) given above, $e_p$ is a unit polarization vector, $\omega_\nu$ is a carrier angular frequency ($\nu$ is a channel number when wavelength multiplexing or frequency multiplexing is used), $A_i(r_t)$ and $\beta$i are the amplitude distribution and the propagation constant respectively where i is the mode order, $r_t$ is a horizontal (other than the z direction) coordinate position vector. When multiplexing is performed by combining those parameters ($e_p$, $\omega_\nu$, $A_i$ ($r_t$), $\phi_i$) that represent alightwave, the multiplexing methods that use one of the parameters are dense wavelength multiplexing (or frequency multiplexing) that uses $\omega_\nu$ and polarization multiplexing that uses $e_p$. In addition, because the fiber is a single-mode fiber, there are multilevel transmission such as differential quadrature phase shift keying (DQPSK) and quadrature amplitude modulation (QAM) which are implemented by combining $A_0$ and $\phi_0$ where i=0.

In addition to the multiplexing methods described above, there is mode division multiplexing transmission. This mode division multiplexing is based on the fact that eigen modes, where the mode orders i of $A_i(r_t)$ are different, form an orthogonal function system.

When a conventionally known multimode fiber is used for mode division multiplexing transmission, mode multiplexing/demultiplexing is difficult because one eigen mode is needed to correspond to one transmission channel. Therefore, multiplexing is performed, not by mode multiplexing, but by mode group multiplexing.

This means that mode division multiplexing transmission requires that, not a multimode fiber, but a multi-core fiber, in which multiple single-mode cores are stored in one optical fiber, be used. Conventionally known configurations for mode division multiplexing transmission via a multi-core fiber, which is formed by storing multiple single-mode cores in one optical fiber, are described in Non-Patent Document 7 and Non-Patent Document 8.

In the mode division multiplexing disclosed in Non-Patent Document 4, there is a correspondence between each mode of a multimode waveguide and a transmission channel. When demultiplexing is performed using the propagation angle differences in a multimode waveguide having multiple modes, the diffraction angle determined by the electromagnetic distribution size at the output end becomes larger than the propagation angle difference in the eigen mode. Therefore, the problem is that the modes cannot be separated and, as a result, mode multiplexing/demultiplexing is difficult.

The technology disclosed in Non-Patent Document 5 is a technology that implements a conventional uncoupled multi-core fiber of homogeneous cores using a photonic crystal fiber. In the technologies disclosed in both Non-Patent Document 4 and Non-Patent Document 5, placing homogeneous cores in close proximity to each other causes an inter-core coupling and, as a result, causes a crosstalk. The problem in this case is that the core interval cannot be narrowed.

In addition, the technology disclosed in Non-Patent Document 7 and Non-Patent Document 8 is a technology that implements a conventional uncoupled multi-core fiber of homogeneous cores. In this case, too, placing homogeneous cores in close proximity to each other causes an inter-core coupling and, as a result, causes a crosstalk. The problem in this case is that the core interval cannot be narrowed.

The technology disclosed in Non-Patent Document is a technology that varies the refractive index difference between the core and the cladding between the two cores and, using the resulting propagation constant difference, avoids a coupling even if the cores are close to each other. However, this document presents a study on the relation between the two cores, which is simply the application of the physical phenomenon, already described in a textbook such as the one given as Non-Patent Document 10, to an optical fiber that stores cores whose cross section is round.

Therefore, it is an object of the present invention to solve the problems described above and to provide, instead of a multimode fiber, a multi-core fiber in which multiple single-mode cores are stored in one optical fiber wherein multiple heterogeneous cores are arranged densely in the multi-core fiber to perform space division multiplexing transmission.

Means to Solve the Problems

A multi-core fiber of the present invention employs the multi-core fiber mode, which corresponds to the “uncoupled” operation aspect in which individual cores are used independently for single-mode transmission, to perform space division multiplexing transmission using a multi-core fiber in which multiple single-mode cores are stored in one optical fiber.

More specifically, the multi-core fiber of the present invention has an aspect of an uncoupled multi-core fiber that makes individual cores correspond to single-mode, independent transmission channels.

According to this multi-core fiber, the transmission bands may be increased in proportion to the number of cores.

A mode of the uncoupled multi-core fiber of the present invention is a multi-core fiber in which a plurality of single-mode cores are stored in one optical fiber wherein fundamental eigen modes of individual cores are spatially localized in an electric field distribution of eigen modes propagating through the fiber to form fundamental eigen modes that do not couple each other but are isolated and signal transmission channels are made to correspond to the fundamental eigen modes of the individual cores to form a space division multiplexing transmission system in which the transmission channels are multiplexed through space division.

In the multi-core fiber of the present invention, a plurality of types of cores are arranged two-dimensionally in a cross section of the multi-core fiber, the plurality of types of cores having different fundamental-mode propagation constants in single-mode fibers, a space-divided uncoupled transmission system is formed with neighboring cores placed in an uncoupled state by different propagation constants of the cores, and to a space division multiplexing transmission system is formed by making the cores correspond, one to one, to single-mode, independent transmission channels.

The uncoupled multi-core fiber of the present invention may comprise a plurality of types of cores having the different propagation constants and, in arranging the plurality of cores, cores having the same propagation constant are arranged with a core-to-core distance between the cores, the core-to-core distance being a distance to make a coupling state between the cores an uncoupled state and, thereby, an uncoupled transmission system is formed.

The uncoupled multi-core fiber of the present invention may comprise three types of cores having the different propagation constants. In arranging the three types of cores, the cores may be most densely arranged where a distance between neighboring cores having different propagation constants is Λ and a distance between cores having the same propagation constant is $\sqrt{3}\Lambda$. In this case, the cores having the same propagation constant are arranged with a distance $\sqrt{3}\Lambda$ between the cores to form an uncoupled transmission system, the distance $\sqrt{3}\Lambda$ being a distance to cause an uncoupled state.

In addition, the uncoupled multi-core fiber of the present invention may comprise two types of cores having the different propagation constants. In arranging the two types of cores, a configuration is possible in which the a plurality of two types of cores having different propagation constants are provided and, in arranging the plurality of cores, the two types of cores are alternately arranged in a grid pattern and cores having the same propagation constant are arranged with a core-to-core distance between the cores, the core-to-core distance being a distance to cause an uncoupled state and, thereby, an uncoupled transmission system is formed.

In an uncoupled system, when homogeneous cores having the same propagation constant (the phase matching condition is satisfied and the maximum value of coupling efficiency is 1) are used, the coupling length must be sufficiently longer than the propagation distance to avoid coupling (crosstalk) between cores. Conversely, when heterogeneous cores having different propagation constants (the phase matching condition is not satisfied and the maximum value of coupling efficiency is not 1) are used, the coupling length becomes inevitably shorter and, so, an uncoupled system must be designed so that maximum value of coupling efficiency, or power-conversion efficiency F, is sufficiently smaller than the reception level.

According to the aspect of the present invention, an uncoupled multi-core fiber avoids coupling (crosstalk) between cores. An uncoupled multi-core fiber may be designed in such a way that the coupling length is sufficiently longer than the propagation distance when homogeneous cores having the same propagation constant are used and that the maximum value of coupling efficiency, or power-conversion efficiency F, is sufficiently smaller than the reception level when heterogeneous cores having different propagation constants are used.

Effect of the Invention

As described above, the present invention substitutes a multi-core fiber, in which multiple single-mode cores are stored in one optical fiber, for a multi-mode fiber to perform space division multiplexing transmission.

The uncoupled multi-core fiber avoids coupling (crosstalk) between cores.

DESCRIPTION OF REFERENCE NUMERALS

| | |
|---|---|
| 10 | Multi-core fiber |
| 11 | Core |
| 11A-11F | Core |
| $11A_A$-$11D_A$ | Core |
| $11A_B$-$11D_B$ | Core |
| 12 | Cladding |

-continued

| | |
|---|---|
| 20 | Uncoupled multi-core fiber |
| 21A-21C | Core |
| 21-2 | Right-side core |
| 21-1 | Left-side core |
| 24A-24C | Transmission channel |

BEST MODE FOR CARRYING OUT THE INVENTION

A preferred embodiment of the present invention will be described in detail below with reference to the drawings.

The following describes a multi-core fiber, more specifically, an uncoupled multi-core fiber, of the present invention with reference to FIG. 1 to FIG. 15.

A multi-core fiber having homogeneous cores, all of which have an equal propagation constant, is called a "Homogeneous Multi-core Fiber (Homogeneous MCF)", while a fiber having multiple cores, which have different propagation constants, is called a "Heterogeneous Multi-core Fiber (Heterogeneous MCF)". The present invention relates to an uncoupled multi-core fiber, and a "Heterogeneous Multi-core Fiber (Heterogeneous MCF)" will be described below.

Figure 1:
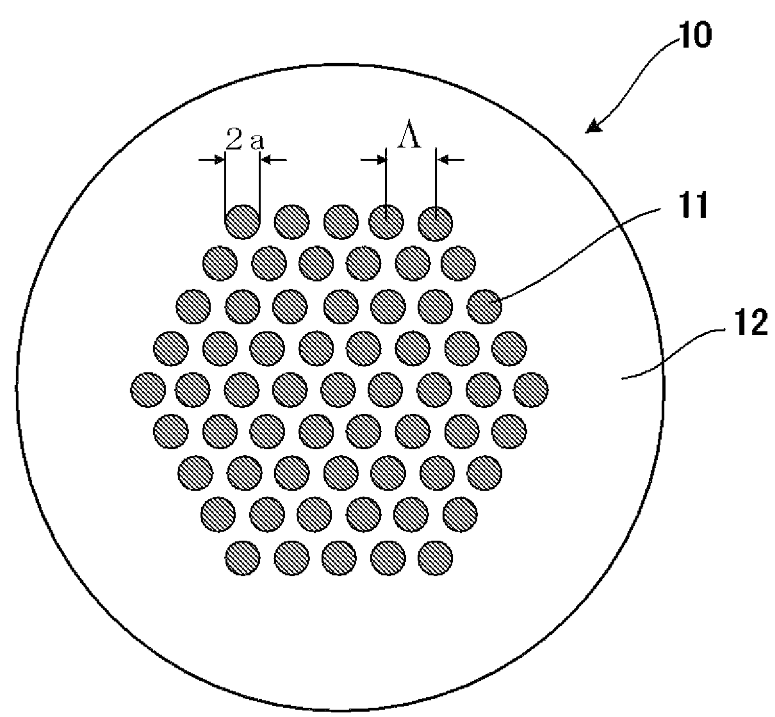
FIG. 1 is a diagram showing the triangular arrangement of the cores of a multi-core fiber.

FIG. 1 shows an example of the core arrangement of a multi-core fiber. Although FIG. 1 shows the triangular arrangement that is a densest arrangement for maximizing the core density, the arrangement is not limited to this exemplary arrangement.

In FIG. 1, a multi-core fiber 10 has cores 11, which have the same propagation constant and are configured in the densest arrangement, and a cladding 12 around the cores. In the figure, the diameter of a core is represented as 2a, and the interval between the neighboring cores as Λ.

Figure 2:
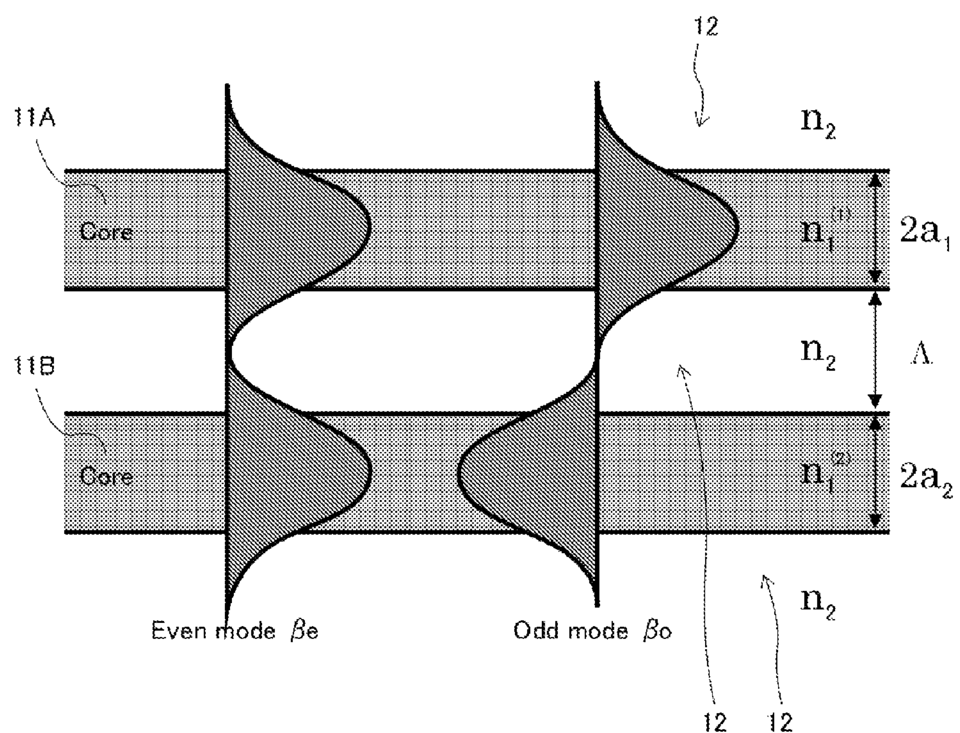
FIG. 2 is a diagram showing a simplest model that illustrates inter-core coupling that is the principle of a multi-core fiber.

FIG. 2 is a diagram showing the simplest model for describing the inter-core coupling of a multi-core fiber. The model shown in FIG. 2 is an example of a two-coupled planar waveguide.

When there are two single-mode fibers and their cores are placed in close proximity to each other, mode coupling is generated between the cores as shown in FIG. 2. Let $\beta_1$ and $\beta_2$ be the propagation constants of the non-perturbed fundamental modes of the two cores respectively when each of them is present alone. Then, when those cores are arranged in parallel to the propagation direction (z direction), the propagation constants $\beta_e$ and $\beta_o$ of the perturbed coupled modes a and b are given respectively as $\beta_e \beta_{ave} = \beta_c$ and $\beta_o = \beta_{ave} - \beta_c$ as shown in FIG. 3. In this case, $\beta_{ave} = (\beta_1 + \beta_2)/2$ is the average propagation constant, and $\beta_c$ is represented as $\beta_c = (\delta^2 + \kappa^2)^{1/2}$ using the phase mismatching amount $\delta = (\beta_1 - \beta_2)/2$ and the coupling coefficient K.

When the fundamental mode is entered from one of the cores, the z-direction dependence of the normalized optical power η in the other core corresponding to the coupling efficiency is represented as $\eta = F \sin^2 \beta_c z$. Note that $F = (\kappa/\beta_c)^2$ is the power-conversion efficiency. The coupling efficiency η has the maximum value when the coupling length $L_c = \pi/(2\beta_c)$ with the maximum value of F. If the phase matching condition $\delta = 0$ is satisfied, $\beta_c = \kappa$ and therefore the maximum value of the coupling efficiency is 1.

On the other hand, γ is defined by expression (2) given below $$\gamma^2 \beta^2 - k_0^2 n_2^2 \quad (2)$$

where the refractive indexes of cores 11A and 11B are equal, that is, $n_1^{(1)} = n_1^{(2)} = n_1$, and β is the propagation constant of each isolated core. Then, in the two-coupled planar waveguide model, two coupled modes are formed, even mode (propagation constant $\beta_e$) and odd mode (propagation constant $\beta_o$), in the weakly coupled approximation.

The propagation constant difference ($\beta_e-\beta_o$) between the even mode and the odd mode in the weakly coupled approximation is approximately represented as follows.

$$\beta_e-\beta_o=2\frac{\kappa^2}{\beta}\cdot\frac{1}{\gamma a}\cdot\frac{\exp(-\gamma\Lambda)}{1+\frac{\kappa^2}{\gamma^2}} \tag{3}$$

The coupling length $L_c$ is represented as follows.

$$L_c=\frac{\pi}{\beta_e-\beta_o} \tag{4}$$

When there are two single-mode fibers with an equal propagation constant and their cores are placed in close proximity to each other, mode coupling is generated between the cores. On the other hand, a longer coupling length $L_c$ reduces the coupling between the cores. To lengthen the coupling length $L_c$ as much as possible, it is necessary to make the core-to-core distance $\Lambda$ sufficiently larger than the core diameter 2a as indicated by expression (3). On the other hand, when two cores having different propagation constants are placed in close proximity to each other, the power-conversion efficiency F becomes sufficiently smaller than 1 to avoid inter-core coupling even if the cores are placed in close proximity.

[Uncoupled Multi-Core Fiber]

An attempt to configure an uncoupled multi-core fiber using the same core requires that the core-to-core interval be considerably large to avoid a crosstalk between the cores, making it difficult to increase the core density. An uncoupled multi-core fiber is fabricated using multiple cores having different propagation constants.

The mode of the uncoupled multi-core fiber of the present invention is as follows. That is, the fiber includes multiple types of cores having different propagation constants in the fundamental mode of single-mode fibers, an uncoupled transmission system is formed by an uncoupled state that exists among the cores because the propagation constants are different among the cores, and the cores are made to correspond, one to one, to single-mode, independent transmission channels. In this way, a space division multiplexing system is formed by the multi-core fiber having multiple cores.

The uncoupled multi-core fiber of the present invention can be configured to include multiple cores of multiple types having different propagation constants. In the arrangement of multiple cores, the cores having the same propagation constant are arranged in such a way that the core-to-core distance of those cores causes an uncoupled state. This arrangement forms an uncoupled transmission system.

Figures 3A, 3B, 3C:
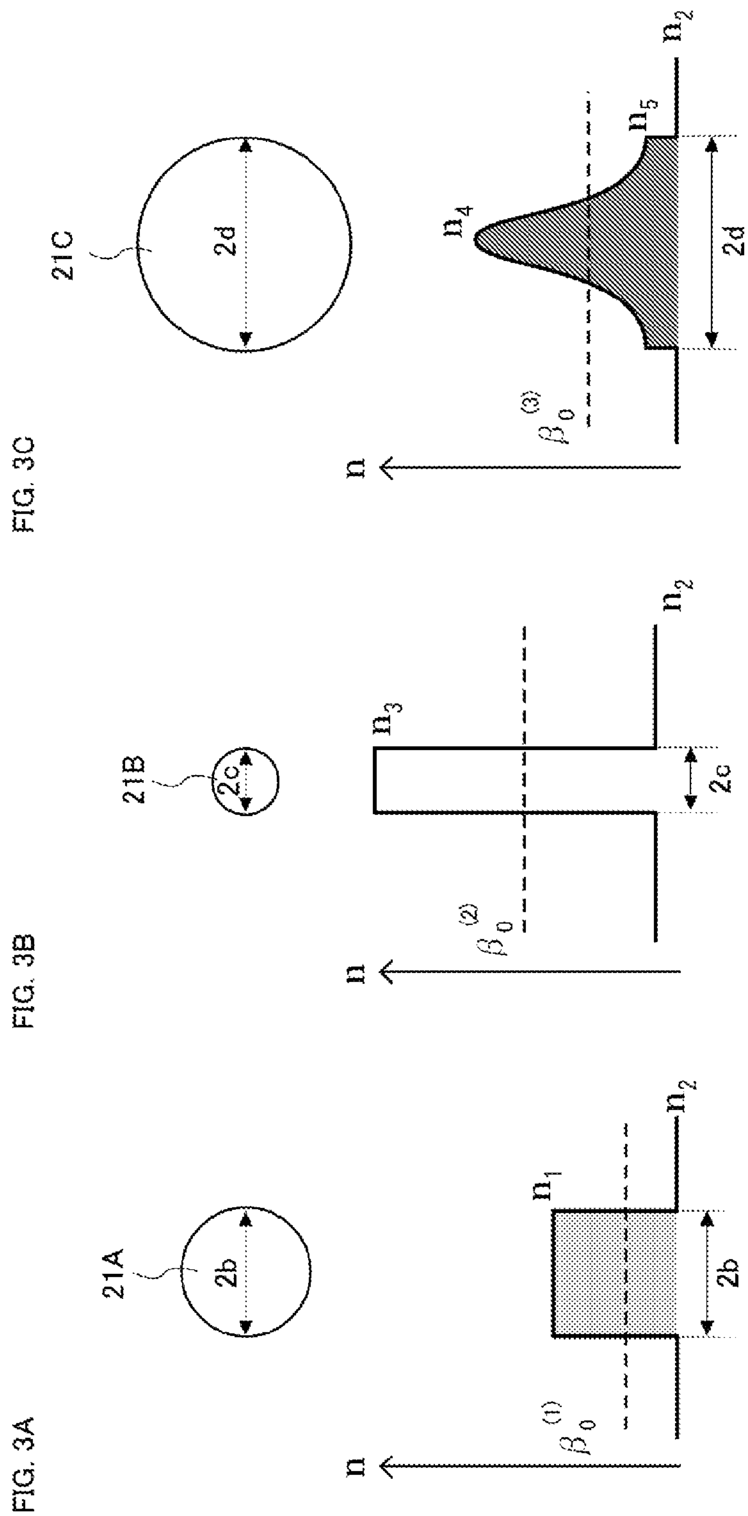
FIG. 3 is a diagram showing an example of cores having different propagation constants.

The uncoupled multi-core fiber of the present invention uses cores having different propagation constants. The propagation constant may be varied by changing the parameters such as the refractive index difference, core diameter, and refractive index distribution. FIG. 3 shows an example of different propagation constants. A core 21A shown in FIG. 3A has the core diameter of 2b and the refractive index of $n_1$. A core 21B shown in FIG. 3B has the core diameter of 2c and the refractive index of $n_3$. A core 21C shown in FIG. 3C has the core diameter of 2d and the refractive index distribution where the refractive index of the peak is $n_4$ and the refractive index of the skirt is $n_5$.

Figure 4:
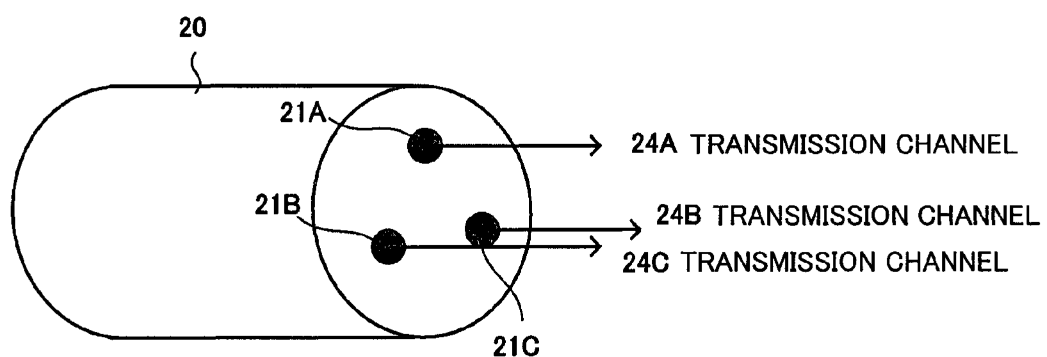
FIG. 4 is a diagram showing the correspondence between the cores and the transmission channels of an uncoupled multi-core fiber of the present invention.

FIG. 4 is a diagram showing the correspondence between the cores and the transmission channels of an uncoupled multi-core fiber of the present invention. In FIG. 4, an uncoupled multi-core fiber 20, which includes the cores 21A-21C having different propagation constants, performs mode division multiplexing transmission with the cores 21A-21C corresponding, one to one, to transmission channels 24A-24C.

Figure 5:
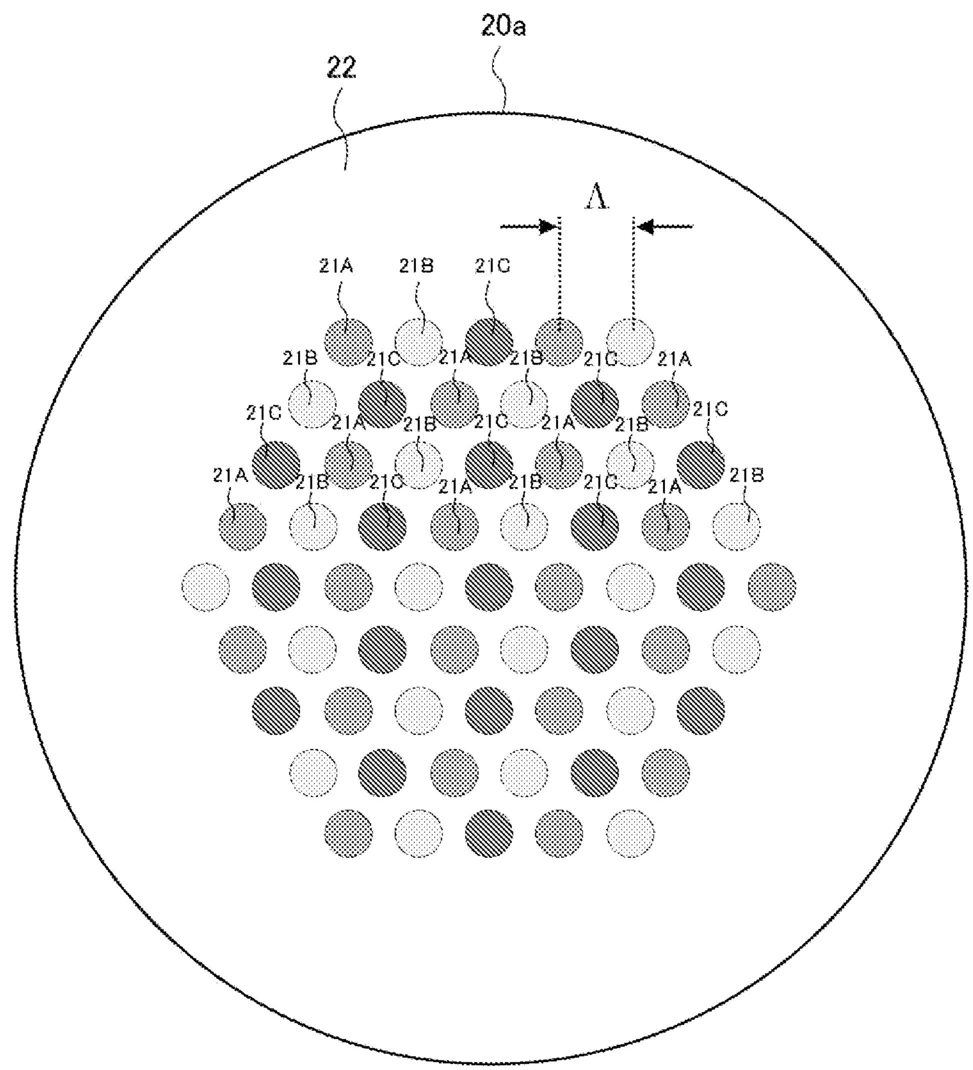
FIG. 5 is a diagram showing an example of the configuration of a most-densely-arranged uncoupled multi-core fiber where heterogeneous cores are configured in the triangular arrangement.

In FIG. 4, though configured to include the cores, one for each of the cores 21A-21C having different propagation constants, the uncoupled multi-core fiber 20 may also be configured to include the cores, two or more for each of the cores 21A-21C having different propagation constants. FIG. 5 shows an example of the configuration of a densest uncoupled multi-core fiber where heterogeneous cores are configured in the triangular arrangement.

In the configuration shown in FIG. 5, three types of cores 21A, 21B, and 21C having different propagation constants are included. These three types of cores are most densely arranged wherein the distance between the neighboring cores having different propagation constants is $\Lambda$ and the distance between the cores having the same propagation constants is $\sqrt{3}\Lambda$. In this case, the distance between the cores having the same propagation constant is $\sqrt{3}\Lambda$ that is large enough to generate an uncoupled state to form an uncoupled transmission system. At this time, the core pitch $\Lambda$ must be set appropriately to make the crosstalk between any two cores sufficiently small.

For a transmission via an uncoupled multi-core fiber where the basic mode of each core is used as an independent transmission channel, it is necessary to avoid coupling between the cores. In addition to the densest arrangement shown in FIG. 5 where the triangular arrangement of heterogeneous cores is used, a rectangular arrangement may also be used as one method to avoid coupling. The rectangular arrangement has an advantage in that the connection becomes easier.

Figure 6:
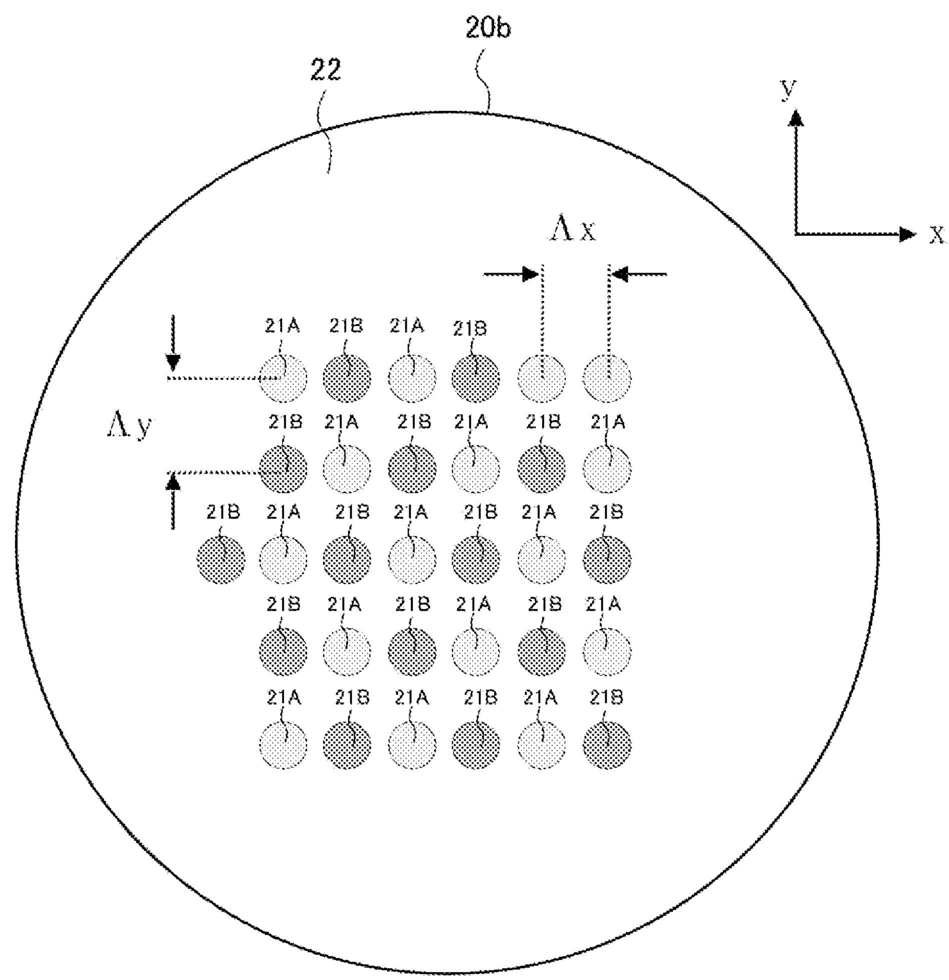
FIG. 6 is a diagram showing an example of the configuration in which two types of cores are alternately arranged in a grid pattern.

The uncoupled multi-core fiber of the present invention may also have a configuration in which two types of cores having different propagation constants are used. In arranging the two types of core, multiple sets of two types of cores having different propagation constants may be used. In arranging multiple cores, the two types of cores are arranged alternately in a grid pattern, and the core-to-core distance between the cores having the same propagation constant is set to generate an uncoupled state, to form an uncoupled transmission system. FIG. 6 shows an example of arrangement in which the two types of cores (21A, 21B) are alternately arranged in a grid pattern.

The two types of cores are arranged in a rectangular form in the x and y directions in the cross section of the fiber with the pitches $\Lambda_x$ and $\Lambda_y$ respectively. In this case, the shortest distance between the cores having the same propagation constant is $\sqrt{(\Lambda_x^2+\Lambda_y^2)}$. Therefore, the core density may be increased by setting this distance large enough to avoid coupling between the cores.

The core density may be increased by appropriately setting the pitch $\sqrt{(\Lambda_x^2+\Lambda_y^2)}$ between the homogeneous cores and the pitches $\Lambda_x$ and $\Lambda_y$ between the heterogeneous cores so that the crosstalk between any two cores becomes sufficiently small.

Unlike the triangular arrangement, this grid pattern arrangement allows different values to be assigned to $\Lambda_x$ and $\Lambda_y$ to indicate the coordinate direction at connection time. Note that, for the coordinate direction, a complete rectangular arrangement, which has the 180-degree symmetry, makes it impossible to determine the direction when the arrangement is inverted. In the exemplary configuration shown in FIG. 6, a core is added to one side of the rectangular arrangement to destroy the symmetry.

FIG. 7 is a diagram showing another arrangement of the cores of uncoupled multi-core fibers 20*c* and 20*d*.

Figure 7A:
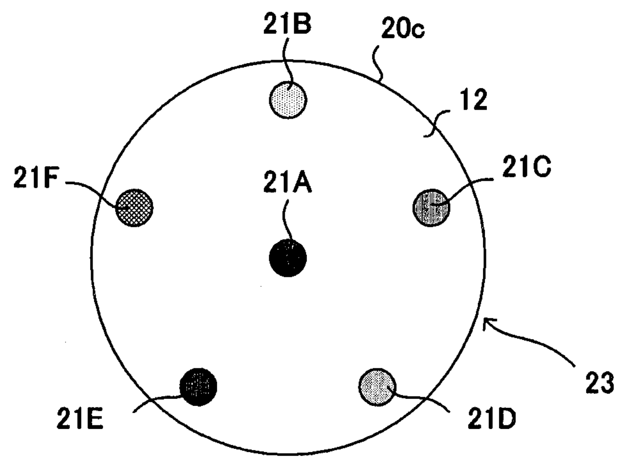
FIG. 7 is a diagram showing another arrangement of the cores of the uncoupled multi-core fiber of the present invention.
Figure 7B:
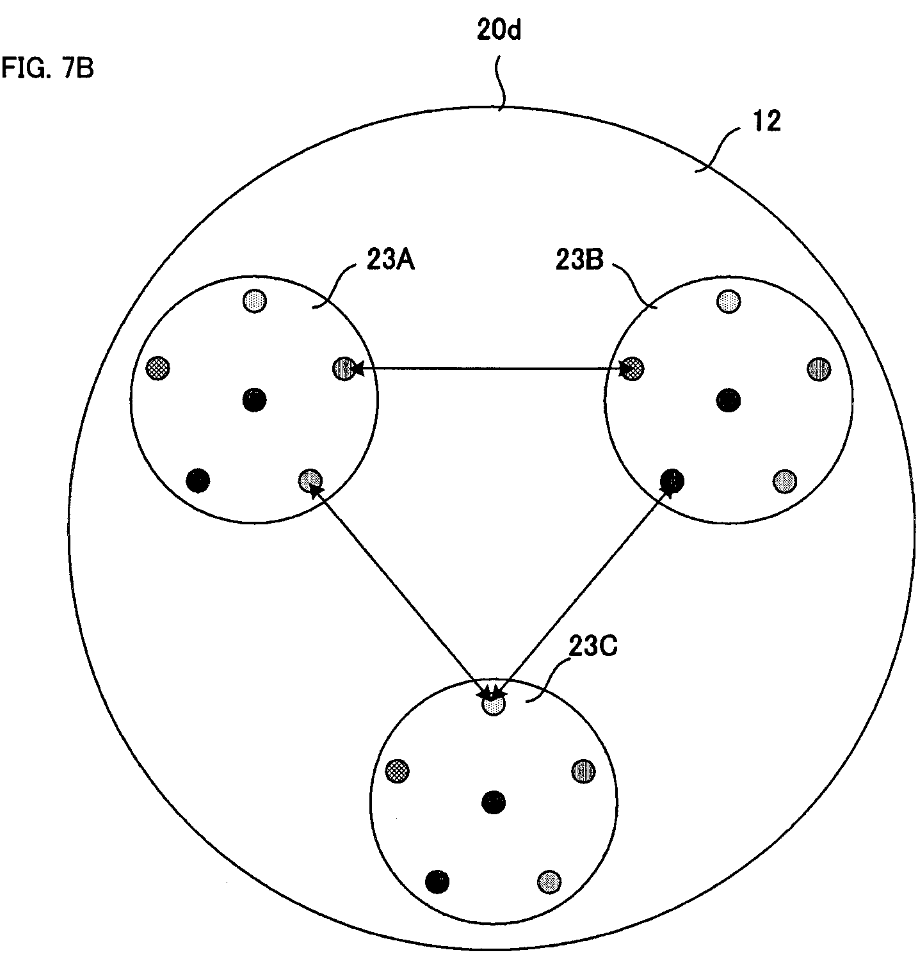

FIG. 7A shows the uncoupled multi-core fiber 20*c* composed of a core group 23 that includes multiple cores 21A-21F. This example shows the configuration in which the cores 21A-21F are equally spaced. FIG. 7B shows an example of the configuration in which multiple core groups 23A-23C, exemplified in FIG. 7A, are arranged.

The following describes the design condition for configuring an uncoupled multi-core fiber using cores with a relative refractive index difference Δ almost equal to that of a normal single-mode fiber, that is, a low relative refractive index difference Δ.

Figure 8:
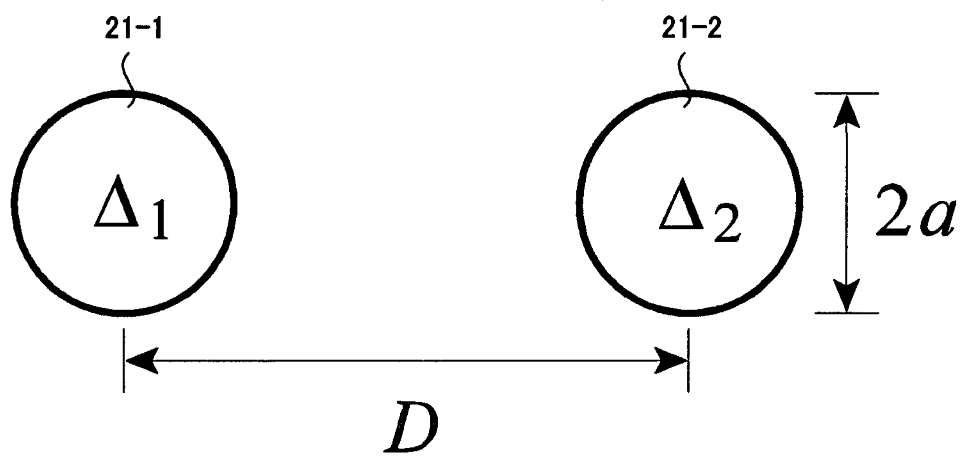
FIG. 8 is a diagram showing the basic structure indicating the relation between the core interval and the coupling efficiency.

In the description below, the two parallel cores such as those shown in FIG. 8 are defined as the basic structure for describing the relation between core intervals and coupling efficiency. In FIG. 8, D is the center-to-center distance between the cores (core interval), the core radius a=4.5 μm, the refractive index of the cladding $n_2$ is 1.45, and the operating wavelength λ=1550 nm.

To allow individual cores to perform single-mode transmission, the refractive index $n_1$ of each core is set so that the relative refractive index difference, defined as $\Delta=(n_1^2-n_2^2)(2n_1^2)$, is 0.40% or lower. Because the coupling efficiency between the homogeneous cores is 1, or 100%, for the coupling length, the coupling length must be set sufficiently larger than the transmission distance to avoid a crosstalk between the cores.

Assume that the transmission distance is 100 km. In this case, the coupling efficiency (crosstalk) after the 100 km transmission is −30 dB and −36 dB respectively when the coupling length is 5000 km and 100000 km. The target value of the coupling length is set to 5000 km so that the crosstalk between the cores becomes −30 dB or lower. The coupling length is given as $L_c=\pi/(2\kappa)$ because the phase mismatching amount δ=0 for the cores that have the same propagation constant. The coupling length may also be represented as $Lc=\pi/(\beta_e-\beta_o)$ using the odd-mode and even-mode propagation constants $\beta_e$ and $B_e$.

In the example shown below, a vector wave analysis (Non-Patent Document 9) is made based on the finite element method in order to estimate, as accurately as possible, the propagation constants in the fundamental mode of each core or even/odd mode as well as the electromagnetic field distribution corresponding to those modes. The coupling coefficient κ is calculated through the integral calculation (Non-Patent Document 10) using the refractive index distribution and the electromagnetic field distribution.

Figure 9:
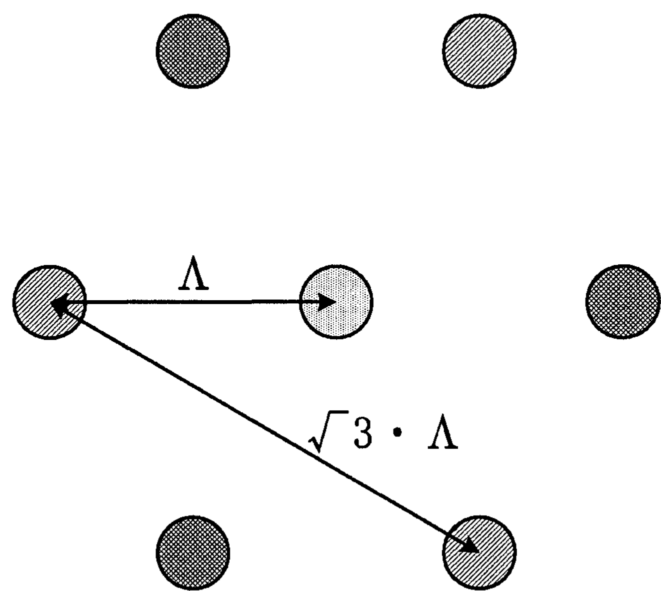
FIG. 9 is a diagram showing the distance between homogeneous cores in the triangular arrangement of three types of cores.

In the triangular arrangement of the three types of cores shown in FIG. 9, the distance between the cores having different propagation constants is Λ while the distance between the cores having the same propagation constant is √3×Λ.

The following describes an example in which a core with a low relative refractive index difference Δ is used and an example in which a core with a high relative refractive index difference Δ is used. In the description below, the example in which the relative refractive index difference is low is denoted as a low relative refractive index difference and the example in which the relative refractive index difference is high is denoted as a high relative refractive index difference. In the example, 0.30-0.40% is set as the low relative refractive index difference Δ, and 1.20-1.30% as the high relative refractive index difference Δ.

[Design Condition for Configuring an Uncoupled Multi-Core Fiber using a Core with a Low Relative Refractive Index Difference Δ]

Figure 10:
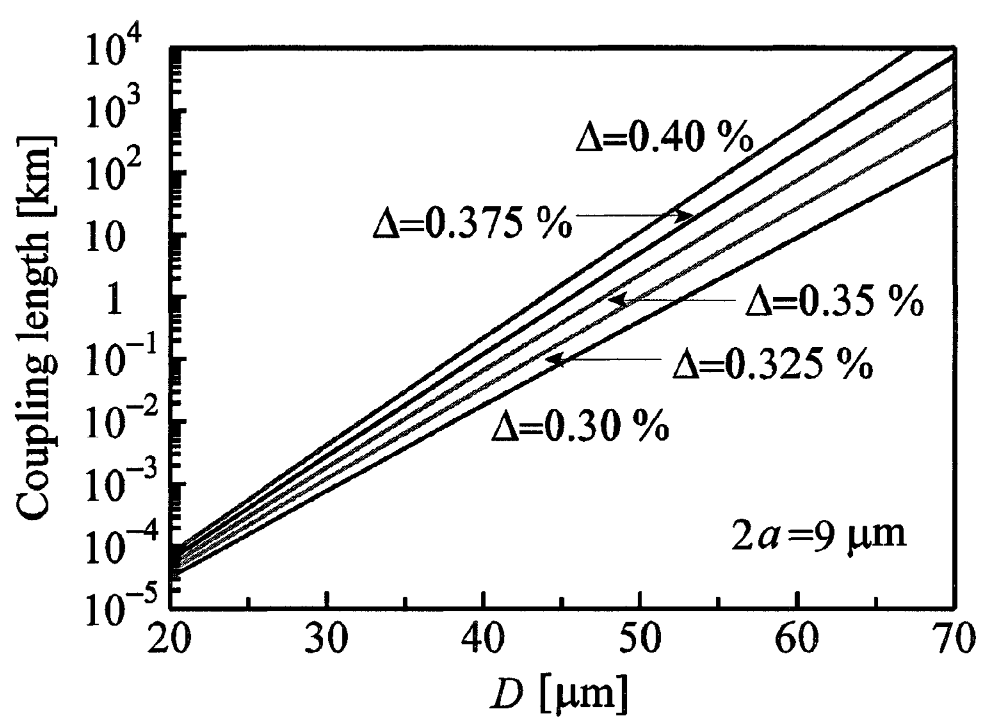
FIG. 10 is a diagram showing the relation between the interval and the coupling length of homogeneous cores with a low relative refractive index difference.

FIG. 10 shows the relation among the relative refractive index difference Δ, the interval D (=√3×Λ) between homogeneous cores, and the coupling length $L_c$ when the homogeneous cores are configured in the triangular arrangement described above. When homogeneous cores are used, the relative refractive index difference $\Delta_1=\Delta_2$ of the cores becomes the same relative refractive index difference Δ.

FIG. 10 shows the relation between the interval D (=√3×Λ) between homogeneous cores and the coupling length $L_c$ when the relative refractive index difference ($\Delta_1=\Delta_2=\Delta$) is varied between 0.30% and 0.40%. FIG. 10 indicates that, when the relative refractive index difference is 0.375% or higher, the coupling length becomes 5000 km or longer with the core interval of about 70 μm. Because the three types of cores are configured in the triangular arrangement in the uncoupled multi-core fiber shown in FIG. 5, the interval (Λ) between the cores having different propagation constant is 70 μm/√3, or about 40 μm, when the interval between the cores having the same propagation constant is 70 μm.

This means that, when the maximum value of the coupling efficiency between heterogeneous cores, or the power-conversion efficiency F, becomes 1/1000 or lower for a neighboring-core interval that is 40 μm or larger, the crosstalk between any two cores becomes −30 dB or lower, allowing each core to independently configure an uncoupled multi-core fiber for use in single-mode transmission.

Figure 11A:
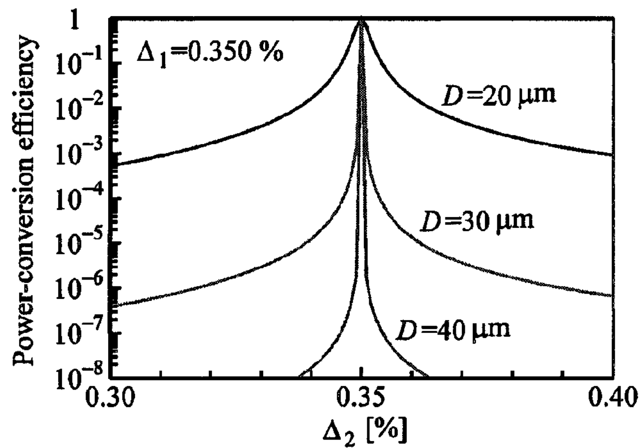
FIG. 11 is a diagram showing how the power-conversion efficiency between heterogeneous cores depends on the relative refractive index difference where the relative refractive index difference is low.
Figure 11B:
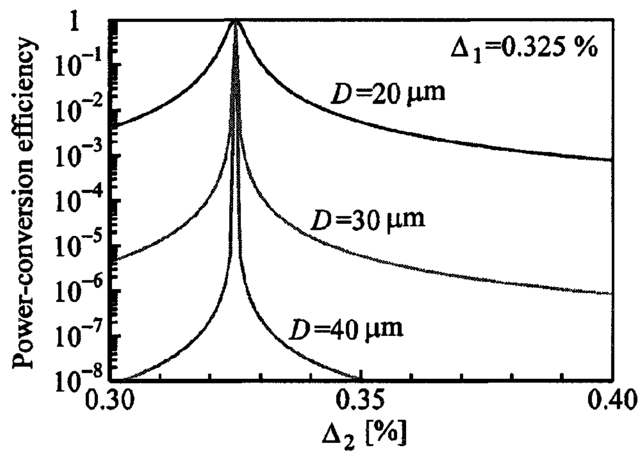
Figure 11C:
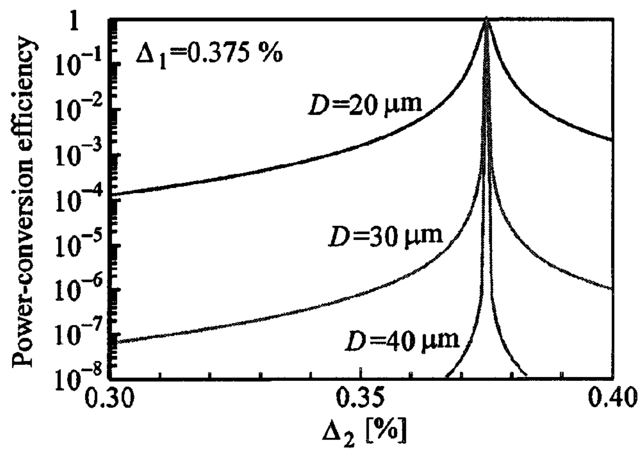

FIGS. 11A, 11B, and 11C show how the power-conversion efficiency between heterogeneous cores depends on $\Delta_2$ (relative refractive index difference of right-side core 21-2) with the core interval D(=Λ) as the parameter where the relative refractive index difference of the left-side core 21-1 shown in FIG. 8 is $\Delta_1$=0.350%, 0.325%, and 0.375%, respectively.

Figure 12A:
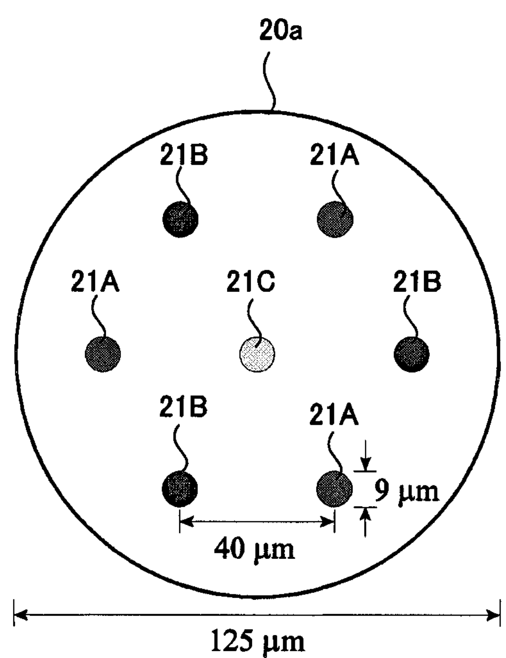
FIG. 12 is a diagram showing an example of arrangement using cores with a low relative refractive index difference.
Figure 12B:
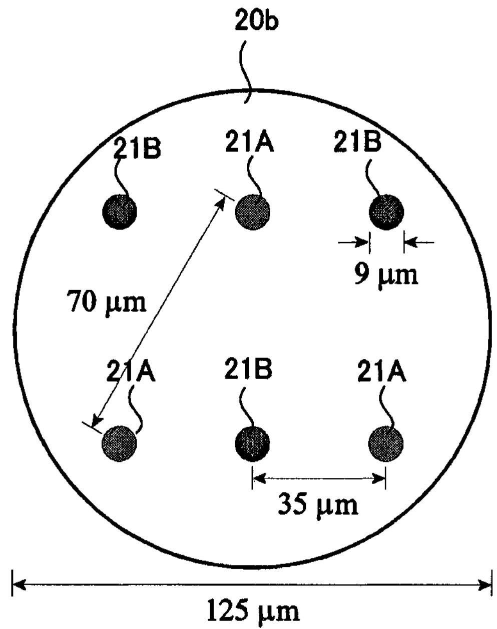

When the core interval is 30 μm, the power coupling ratio is reduced from 1/1000 to 1/10000 or smaller if the difference between the relative refractive index differences $\Delta_1$ and $\Delta_2$ of the two cores is as small as 0.005%. When the core interval is 40 μm, the power-conversion efficiency becomes still smaller. Therefore, by selecting three relative refractive index differences, each of which reduces the crosstalk between heterogeneous cores to −30 dB or lower, from the values in the range 0.375-0.40% and then configuring the cores in the triangular arrangement with the core pitch of 40 μm (or 70 μm, √3 times of that interval, for homogeneous cores), seven cores may be stored as shown in FIG. 12A when the cladding diameter is 125 μm that is the standard size. Also, by configuring two types of cores, each of which satisfies this condition, in the rectangular arrangement when the interval between homogeneous cores is 70 μm and the x-direction core pitch $\Lambda_x$=35 μm, six cores may be stored as shown in FIG. 12B.

To further increase the core density, a core with a higher relative refractive index difference must be used.

[Design Condition for Configuring an Uncoupled Multi-Core Fiber using a Core with a High Relative Refractive Index Difference Δ]

Next, the following describes the design condition for configuring an uncoupled multi-core fiber using a core with a high relative refractive index difference Δ.

Assume that the core radius is reduced to a=2.5 μm and that the refractive index of the cladding and the operating wavelength are $n_2$=1.45 and λ=1550 nm, respectively, as for a core with a low relative refractive index difference Δ. For the refractive index of the core, the relative refractive index difference is set to 1.30% or lower to allow each core to perform single-mode transmission.

Figure 13:
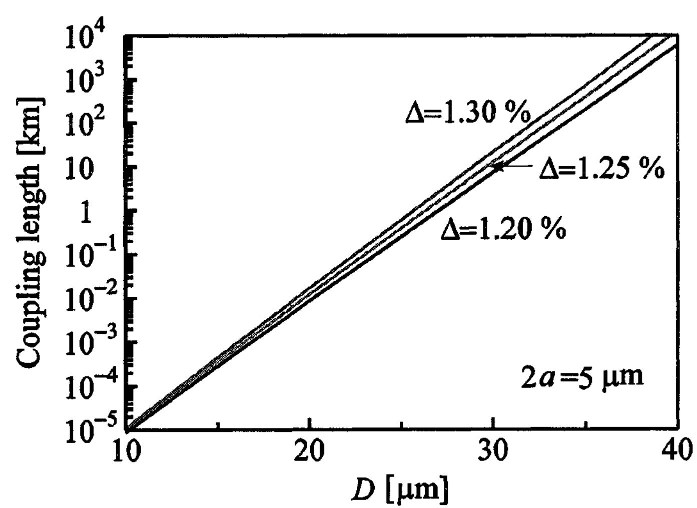
FIG. 13 is a diagram showing the relation between the interval and the coupling length of homogeneous cores with a high relative refractive index difference.

FIG. 13 shows the relation among the relative refractive index difference Δ, the interval D (=√3×Λ) between homogeneous cores, and the coupling length $L_c$ when the homogeneous cores are configured in the triangular arrangement described above. FIG. 13 also shows the relation between the interval D (=√3×Λ) between homogeneous cores and the coupling length $L_c$ when the relative refractive index difference ($\Delta_1=\Delta_2=\Delta$) is varied between 1.20% and 1.30%.

FIG. 13 indicates that, when the relative refractive index difference is 1.20% or higher, the coupling length becomes 5000 km or longer with the core interval of about 40 μm. In the uncoupled multi-core fiber configured in the triangular arrangement shown in FIG. 5, the interval (Λ) between heterogeneous cores is 40 μm/√3, or about 23 μm, when the interval between homogeneous cores is 40 μm. This means that, when the maximum value of the coupling efficiency between heterogeneous cores, or the power-conversion efficiency F, becomes 1/1000 or lower for a neighboring-core interval that is 23 μm or larger, the crosstalk between any two cores becomes −30 dB or lower, allowing each core to independently configure an uncoupled multi-core fiber for use in single-mode transmission.

Figure 14A:
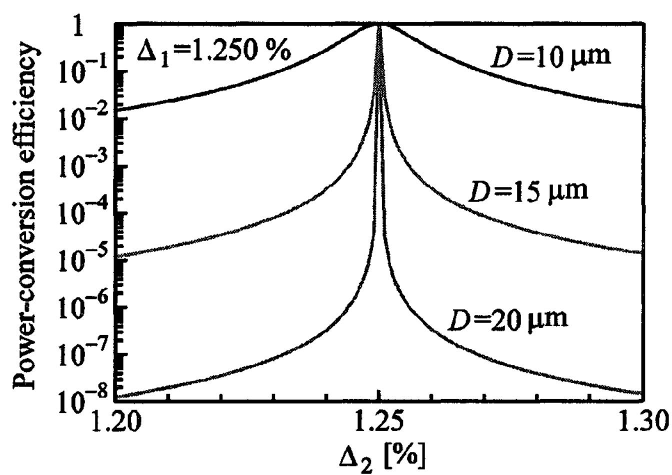
FIG. 14 is a diagram showing how the power-conversion efficiency between heterogeneous cores depends on the relative refractive index difference where the relative refractive index difference is high.
Figure 14B:
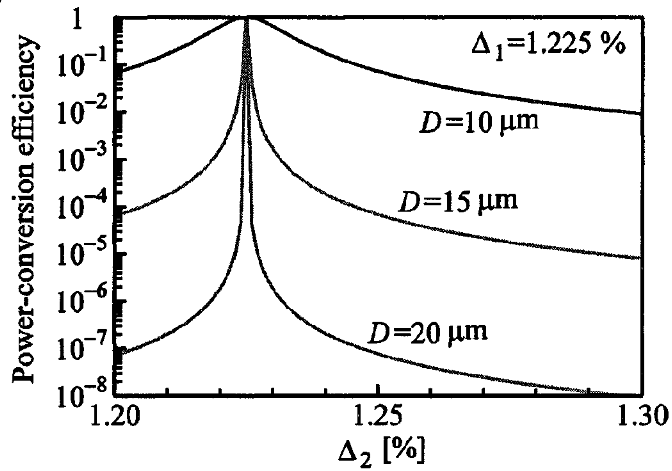
Figure 14C:
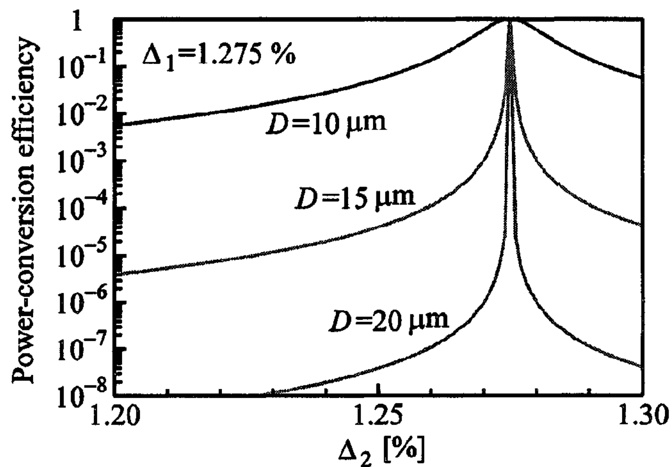
Figure 15A:
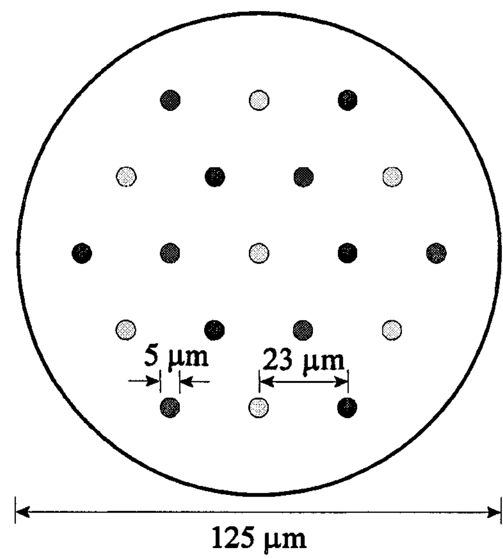
FIG. 15 is a diagram showing an example of arrangement using cores with a high relative refractive index difference.

FIGS. 14A, 14B, and 14C show how the power-conversion efficiency between heterogeneous cores depends on $\Delta_2$ (relative refractive index difference of right-side core 21-2) with the core interval D(=Λ) as the parameter when the relative refractive index difference of the left-side core 21-1 shown in FIG. 8 is $\Delta_1$=1.250%, 1.225%, and 1.275%, respectively. When the core interval is 20 μm, the power-conversion efficiency becomes negligibly small except the part that is very near to $\Delta_2=\Delta_1$. Therefore, by selecting three relative refractive index differences, each of which reduces the crosstalk between heterogeneous cores to −30 dB or lower, from the values in the range 1.20-1.30% and then configuring the cores in the triangular arrangement with the core pitch of 23 μm (or 40 μm, √3 times of that interval, for homogeneous cores) as in the case of a low Δ core, 19 cores may be stored as shown in FIG. 15A when the cladding diameter is 125 μm that is the standard size.

Figure 15B:
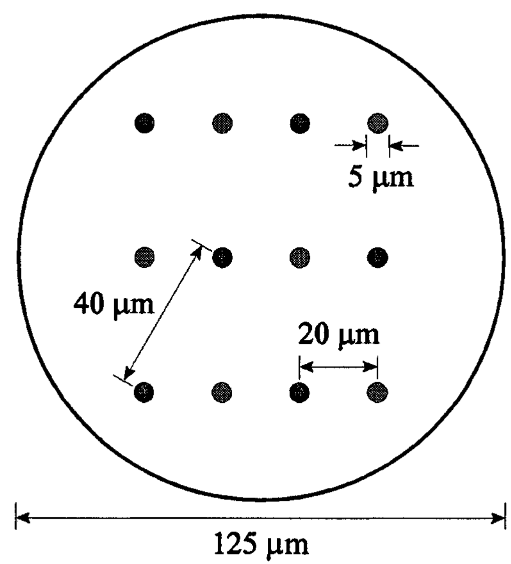

Also, by configuring two types of cores, each of which satisfies this condition, in the rectangular arrangement where the interval between homogeneous cores is 40 μm and the x-direction core pitch $\Lambda_x$=20 μm, 12 cores may be stored as shown in FIG. 15B.

A fiber with a larger cladding diameter may include more cores. Also, a larger number of heterogeneous cores allow a fiber to include more cores. In this case, it is necessary to select the value of the relative refractive index difference of each core and to appropriately arrange the cores so that the crosstalk between any two cores, including not only homogeneous cores but also heterogeneous cores, becomes smaller than the target value.

To make a basic study on a method for configuring an uncoupled multi-core fiber, only the relative refractive index difference is changed in the description above assuming that the refractive index in a core is constant and the cores have the same diameter. However, note that the refractive index in a core need not be constant and cores having different sizes may also be used.

As described above, the present invention provides a coupled multi-core fiber in which coupling modes correspond to independent transmission channels and an uncoupled multi-mode fiber in which individual cores correspond to independent transmission channels, thus allowing a multi-core fiber to be configured for use in high-density space division multiplexing.

In the uncoupled multi-core fiber of the present invention, heterogeneous cores are arranged to provide a configuration for avoiding coupling between cores and for increasing the core density. On the other hand, the uncoupled multi-core fiber of the present invention does not contribute to an increase in the effective core cross section area $A_{eff}$.

INDUSTRIAL APPLICABILITY

The present invention is applicable to optical communications, optical information processing, and optical interconnection.

The invention claimed is:

1. A method of arranging cores of a multi-core fiber in which a plurality of single-mode cores are accommodated in one optical fiber comprising the steps of:

in an electric field distribution of eigen modes propagating through the fiber, fundamental eigen modes of individual cores being spatially localized to form fundamental eigen modes that do not couple each other but are isolated, and signal transmission channels being made to correspond to the basic fundamental eigen modes of the individual cores to comprise a space division multiplexing system in which the transmission channels are multiplexed through space division, a plurality of types of three or more cores being arranged two-dimensionally in a cross section of the multi-core fiber, said plurality of types of cores having different fundamental-mode propagation constants in single-mode fibers, and between neighboring cores, heterogeneous cores having different propagation constants being placed in an uncoupled state by a difference in the propagation constants, and homogeneous cores having the same propagation constant being placed in an uncoupled state by a core-to-core distance, to comprise an uncoupled transmission system in which the cores are spatially divided, in forming the uncoupled state between the heterogeneous cores, the different propagation constants being determined by calculating a propagation constant difference from a power-conversion efficiency, which is set based on a power-conversion efficiency whose parameter is the propagation constant difference and by selecting different propagation constants that satisfy the calculated propagation constant difference, and cores having the selected different propagation constants being arranged to form the uncoupled state between the heterogeneous cores, in forming the uncoupled state between the homogeneous cores, the core-to-core distance being determined as the core-to-core distance between the neighboring homogeneous cores by the propagation constant of the cores and a specified coupling length based on a coupling length relation determined by a weak coupling approximation including the propagation constant and the core-to-core distance as parameters, and the homogeneous cores being arranged with the determined core-to-core distance between the cores to form the uncoupled state between the homogeneous cores, and a space division multiplexing transmission system being comprised by making said cores correspond, one to one, to single-mode, independent transmission channels.

2. The method of arranging cores of multi-core fiber according to claim 1 wherein a plurality of three types of cores having the different propagation constants being provided, and in arranging said plurality of cores, the cores being most densely arranged in a triangular arrangement where a distance between neighboring cores having different propagation constants is Λ and a distance between cores having the same propagation constant is ·3Λ, and cores having the same propagation constant being arranged with a distance √3Λ between the cores to comprise an uncoupled transmission system, said distance √3Λ being a distance to form an uncoupled state.

3. The method of arranging cores of multi-core fiber according to claim 1 wherein a plurality of two types of cores having the different propagation constants being provided, and in arranging said plurality of cores, said two types of cores being alternately arranged in a grid pattern in a rectangular form.

* * * * *